(12) United States Patent
Iihoshi et al.

(10) Patent No.: US 6,883,307 B2
(45) Date of Patent: Apr. 26, 2005

(54) DIAGNOSIS APPARATUS FOR INTERNAL COMBUSTION ENGINE

(75) Inventors: Yoichi Iihoshi, Tsuchiura (JP); Minoru Ohsuga, Hitachinaka (JP); Yutaka Takaku, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/083,496

(22) Filed: Feb. 27, 2002

(65) Prior Publication Data

US 2003/0046924 A1 Mar. 13, 2003

(30) Foreign Application Priority Data

Sep. 7, 2001 (JP) ........................................ 2001-272214

(51) Int. Cl.$^7$ ................................................ F01N 3/00
(52) U.S. Cl. ............................ 60/277; 60/284; 60/285; 60/297; 60/299
(58) Field of Search ......................... 60/274, 277, 285, 60/297, 284, 300, 295, 299

(56) References Cited

U.S. PATENT DOCUMENTS

| | | | | |
|---|---|---|---|---|
| 5,738,832 A | * | 4/1998 | Dogahara et al. | 422/171 |
| 5,761,902 A | * | 6/1998 | Usami et al. | 60/288 |
| 5,804,148 A | * | 9/1998 | Kanesaka et al. | 422/174 |
| 6,012,284 A | * | 1/2000 | Tanaka et al. | 60/297 |
| 6,158,212 A | * | 12/2000 | Tanaka | 60/277 |
| 6,401,451 B1 | * | 6/2002 | Yasui et al. | 60/277 |

FOREIGN PATENT DOCUMENTS

| | | |
|---|---|---|
| EP | 0 972 914 | 1/2000 |
| JP | 06-101452 | 4/1994 |
| JP | 06-229235 | 8/1994 |
| JP | 11-002115 | 1/1999 |
| JP | 11-006424 | 1/1999 |
| JP | 11-324659 | 11/1999 |

* cited by examiner

*Primary Examiner*—Binh Q. Tran
(74) *Attorney, Agent, or Firm*—Crowell & Moring LLP

(57) ABSTRACT

In an internal combustion engine diagnosis apparatus comprising a cleanup catalyst arranged on an exhaust pipe of an internal combustion engine and an HC adsorption catalyst arranged downstream of and in parallel to the cleanup catalyst, degradation and failure of the HC adsorption catalyst is accurately diagnosed. The internal combustion engine diagnosis apparatus comprising the cleanup catalyst arranged in the exhaust pipe of the internal combustion engine; and the HC adsorption catalyst arranged in parallel to and downstream of the cleanup catalyst, during high temperature period the HC adsorption catalyst desorbing and cleaning up HC desorbed during low temperature period, wherein degradation of the HC adsorption catalyst is diagnosed based on a gradient of temperature of the HC adsorption catalyst during a period when temperature of the HC adsorption catalyst is within a range of 50° C. to 250° C.

12 Claims, 8 Drawing Sheets

DIAGNOSIS APPARATUS FOR INTERNAL COMBUSTION ENGINE

BACKGROUND OF THE INVENTION

This application claims the priority of Application No. 2001-272214, filed Sep. 7, 2001, in Japan, the disclosure of which is expressly incorporated by reference herein.

The present invention relates to an internal combustion engine diagnosis apparatus for diagnosing a catalyst to clean up a gas exhausted from an internal combustion engine, and particularly to an internal combustion engine diagnosis apparatus for diagnosing an HC adsorption catalyst which adsorbs HC when the internal combustion engine is in low temperature, and desorbs and cleans up HC when the internal combustion engine is in high temperature.

The exhaust gas (HC, NOx, CO) exhausted from an internal combustion engine can be cleaned up by a cleanup catalyst (ternary catalyst) arranged in an exhaust pipe. However, there has been a problem in that at starting of the internal combustion engine, HC is exhausted from the internal combustion engine until the cleanup catalyst is activated. Accordingly, a problem of reducing an amount of the exhausted HC still remains.

Therefore, a method of reducing exhaust of HC is proposed (refer to, for example, Japanese Patent Application Laid-Open No. 6-101452). The method employs an HC adsorption catalyst having a function of adsorbing HC exhausted from an internal combustion engine when temperature of the catalyst is low, and desorbing and cleaning up HC as temperature of the catalyst is increased.

FIG. 1 is a schematic diagram showing the cleanup principle of the HC adsorption catalyst. In the HC adsorption catalyst for cleaning up the HC at starting of the internal combustion engine, HC is adsorbed to zeolite during low temperature, as shown in FIG. 1 (a), and HC desorbed from the zeolite is oxidized on a noble metal, as shown in FIG. 1 (b).

Since degradation of adsorption performance of the HC adsorption catalyst is directly connected to degradation of the exhaust gas, utilizing the relationship between an adsorption amount of HC and an adsorption amount of water, U.S. Pat. No. 2,894,135 proposes an exhaust gas cleanup system for internal combustion engine. In the exhaust gas cleanup system, an adsorbent having a function of adsorbing HC in an exhaust gas under a given low temperature condition and an exhaust gas cleanup catalyst having a function of cleaning up pollution substances under a given high temperature condition are arranged in the exhaust system of the internal combustion engine. Under the low temperature condition before activating the exhaust gas cleanup catalyst, HC is adsorbed to the adsorbent. Under the high temperature condition after activating the exhaust gas cleanup catalyst, the HC adsorbed to the adsorbent is desorbed, and the desorbed HC is cleaned up by the exhaust gas cleanup catalyst. The proposed exhaust gas cleanup system for internal combustion engine comprises an operating state detection means for detecting an operating state of the engine; an exhaust gas temperature detection means for detecting exhaust gas temperatures at the inlet side and the outlet side of the adsorbent; an actual supplied heat equivalent value calculation means for calculating a value equivalent to an actual amount of heat supplied to the adsorbent from the exhaust gas based on the exhaust gas temperature and the exhaust gas flow rate in the inlet side of the adsorbent during dew-point period of the exhaust gas detected based on the state of the exhaust gas temperature in the outlet side of the adsorbent; an HC adsorption total amount estimation means for estimating an total amount of HC adsorbed to the adsorbent under a given adsorption condition based on the operating state of the engine; a reference supplied heat equivalent value calculation means for calculating a value equivalent to an amount of reference supplied heat supplied to the adsorbent in non-degraded state from the exhaust gas during the dew-point period of the exhaust gas based on the estimated total amount of adsorbed HC; and a degradation degree detection means for detecting a degradation degree of the adsorbent based on the calculated reference supplied heat equivalent value and the calculated actual supplied heat equivalent value.

Further, Japanese Patent Application Laid-Open No. 11-324659 proposes a system for diagnosing a degradation state of a hydrocarbon converting efficiency of a catalyst converter including a catalyst by measuring the catalyst temperature during the activation period. The system is a hydrocarbon converting efficiency degradation diagnosis apparatus for a catalyst converter which comprises a temperature sensor for continuously generating a first output signal expressing the catalyst temperature integrated with the catalyst converter; and a controller generating a second output signal for instructing the hydrocarbon efficiency of the catalyst converter based on variation of the catalyst temperature during the activation period.

However, the conventional diagnosing technology has the following problems to be explained below. FIG. 2 is a schematic graph showing the relationship between adsorption rate/cleanup rate and temperature of an HC adsorption catalyst. Degradation 1 shown in FIG. 2 indicates degradation of adsorption performance caused by thermal destruction of zeolite, and degradation 2 indicates degradation of activation performance (light-off performance) caused by thermal coagulation of the noble metal. Further, the HC adsorbed to the zeolite is desorbed in the catalyst temperature range of 50° C. to 250° C. though it depends on the operating condition of the internal combustion engine.

FIG. 3 shows the relationship between the amount of adsorbed HC and the amount of released or emitted HC without being cleaned up during being desorbed (the released HC amount). It can be understood from the figure that in the invention of U.S. Pat. No. 2,894,135, the degradation in the case of degradation 1 can be judged because the amount of adsorption is reduced, but the degradation in the case of degradation 2 can not be judged because the amount of adsorption is not reduced. Therefore, there is possibility that the degradation of exhaust gas can not accurately detect.

On the other hand, the technology described in Japanese Patent Application Laid-Open No. 11-324659 detects only the degradation of the light-off performance corresponding to the degradation 2 based on the variation of the catalyst temperature during operating period, and the heat of adsorption specific to the HC adsorption catalyst and the variation of heat capacity of the catalyst are not taken into consideration. Therefore, there is also possibility that the degradation of exhaust gas can not accurately detect.

SUMMARY OF THE INVENTION

In order to solve the above problem, an object of the present invention is to provide an internal combustion engine diagnosis apparatus which can accurately diagnose the HC cleanup performance in the HC adsorption catalyst.

That is, the first object of the present invention is to provide an internal combustion engine diagnosis apparatus which can accurately diagnose degradation of the HC adsorption catalyst. The second object of the present invention is to provide an internal combustion engine diagnosis apparatus which can diagnose the HC adsorption catalyst without being affected by a degradation state of a cleanup catalyst arranged upstream of the HC adsorption catalyst and can diagnose the upstream cleanup catalyst. Further, the third object of the present invention is to provide an internal combustion engine diagnosis apparatus which can diagnose the HC adsorption catalyst without being affected by the operating condition of the internal combustion engine.

In order to attain the above objects, an internal combustion engine diagnosis apparatus in accordance with the present invention basically comprises a cleanup catalyst arranged in an exhaust pipe of an internal combustion engine; and an HC adsorption catalyst arranged in parallel to and downstream of the cleanup catalyst, during high temperature period the HC adsorption catalyst desorbing and cleaning up HC desorbed during low temperature period, wherein degradation of the HC adsorption catalyst is diagnosed based on temperature of the HC adsorption catalyst while HC is being desorbed from the HC adsorption catalyst (during HC desorbing period).

Further, other features of the internal combustion engine diagnosis apparatus in accordance with the present invention are characterized by that degradation of the HC adsorption catalyst is diagnosed based on a gradient of temperature of the HC adsorption catalyst during a period when temperature of the HC adsorption catalyst is within a range of 50° C. to 250° C., and that the internal combustion engine comprises a temperature detector for detecting temperature of the HC adsorption catalyst, and degradation of the HC adsorption catalyst is diagnosed based on a detected value of the temperature detector.

Based on the structure described above, the internal combustion engine diagnosis apparatus can diagnose degradation of the HC adsorption catalyst from a condition of temperature variation of the HC adsorption catalyst when the temperature during desorbing of HC from the HC adsorption catalyst is within the range of 50° C. to 250° C. That is, since the internal combustion engine diagnosis apparatus utilizes the heat of reaction at desorbing HC of the HC adsorption catalyst (the heat of reaction is decreased as the degradation is progressed), the HC cleanup performance of the HC adsorption catalyst can be accurately diagnosed, and diagnosis of the HC adsorption catalyst can be performed without being affected by the degradation state of the cleanup catalyst arranged upstream of the HC adsorption catalyst.

Further, other features of the internal combustion engine diagnosis apparatus in accordance with the present invention are characterized by that a temperature gradient during evaporating of water adsorbed to the HC adsorption catalyst is calculated, and the temperature gradient is compared with a preset diagnosis threshold, and if the temperature gradient is smaller than the diagnosis threshold, it is judged that the HC adsorption catalyst is degraded; and that a temperature gradient after evaporating of water adsorbed to the HC adsorption catalyst is calculated, and the temperature gradient is compared with a preset diagnosis threshold, and if the temperature gradient is larger than the diagnosis threshold, it is judged that the HC adsorption catalyst is degraded; and that a temperature gradient during evaporating of water adsorbed to the HC adsorption catalyst and a temperature gradient after evaporating of water adsorbed to the HC adsorption catalyst are calculated, and a ratio of the two temperature gradients is compared with a preset diagnosis threshold, and if the temperature gradient ratio is larger than the diagnosis threshold, it is judged that the HC adsorption catalyst is degraded.

The above-described structure of the internal combustion engine diagnosis apparatus in accordance with the present invention utilizes the fact that the temperature variation state of the HC adsorption catalyst is different between during evaporating of water adsorbed to the HC adsorption catalyst and after evaporating of the water, that is, there is a difference between the catalyst temperature variation caused by the heat of reaction of the HC catalyst desorption and the catalyst temperature variation caused by the catalyst cleanup. By employing the above-described structure, it is possible to accurately diagnose the HC adsorption catalyst.

Further, other features of the internal combustion engine diagnosis apparatus in accordance with the present invention are characterized by that a time period that HC is being desorbed from the HC adsorption catalyst (HC desorbing time period) is measured, and if the HC desorbing time period is larger than a preset diagnosis threshold, it is judged that the HC adsorption catalyst is degraded; and that the HC desorbing time period is a period from time that temperature of the HC adsorption catalyst exceeds 50° C. to time that the temperature reaches 250° C.

Further, other features of the internal combustion engine diagnosis apparatus in accordance with the present invention are characterized by that if the desorbing time period exceeds a preset time, judgment of degradation of the HC adsorption catalyst is prohibited; and that if a cumulative value or a maximum value of a flow rate of air flowing into the internal combustion engine during the HC desorbing time period exceeds a preset value, judgment of degradation of the HC adsorption catalyst is prohibited.

Further, other features of the internal combustion engine diagnosis apparatus in accordance with the present invention are characterized by that the diagnosis threshold is corrected based on a flow rate of air flowing into the internal combustion engine during the HC desorbing time period; and that the internal combustion engine diagnosis apparatus comprises an air flow rate measurement instrument for measuring a flow rate of air flowing into the internal combustion engine.

Further, another feature of the internal combustion engine diagnosis apparatus in accordance with the present invention is characterized by that when the HC desorbing time period exceeds the diagnosis threshold corrected based on the flow rate of air flowing into the internal combustion engine, it is judged that the cleanup catalyst arranged upstream of the HC adsorption catalyst is degraded.

Other objects, advantages and novel features of the present invention will become apparent from the following detailed description of the invention when considered in conjunction with the accompanying drawings.

DETAILED DESCRIPTION OF THEE PREFERRED EMBODIMENTS

An embodiment of an internal combustion engine diagnosis apparatus in accordance with the present invention will be described below in detail, referring to the accompanied drawings.

Figure 4:
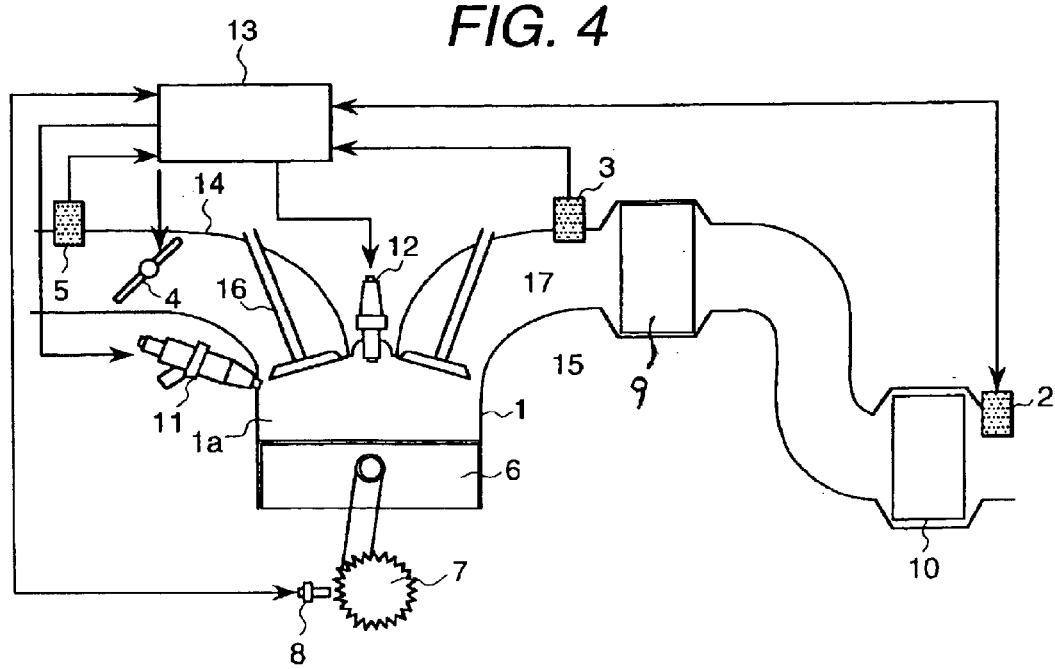
FIG. 4 is a diagram showing a direct injection internal combustion engine to which an embodiment of an internal combustion engine diagnosis apparatus of the present invention is applied.

FIG. 4 shows the overall outline of a direct injection internal combustion engine to which the embodiment of the internal combustion engine diagnosis apparatus is applied. The internal combustion engine 1 comprises a piston 6 and a combustion chamber 1a; and an intake pipe 14 and an exhaust pipe 15 in the upper portion of the combustion chamber 1a; and an intake valve 16 and an exhaust valve 17 in the opening portions of the intake pipe 14 and the exhaust pipe 15.

Although the present embodiment of the diagnosis apparatus for the internal combustion engine 1 is installed as a program of an ECU 13 of the internal combustion engine, it may be installed in a microcomputer separated from the ECU 13.

In the exhaust pipe 15 of the present embodiment, a cleanup catalyst 9 (a pre-catalyst) is arranged, and an HC adsorption catalyst 10 is arranged downstream of the cleanup catalyst 9. A temperature signal from a temperature sensor 2 for detecting temperature of the HC adsorption catalyst 10, an oxygen concentration signal from an oxygen (an air-fuel ratio) sensor 3 attached to a position upstream of the cleanup catalyst, an air flow rate signal from an air flow rate sensor 5 provided upstream of a throttle 4 of the intake pipe 14, a rotation angle signal from a crank angle sensor 8 attached to a crank shaft 7 connected to the piston 6 and so on are input to the ECU 13.

A fuel injection signal to an injector 11 for injecting fuel based on the input information, an ignition signal to a spark plug 12, a throttle control signal to the throttle 4 for regulating an air flow rate and so on are output from the ECU 13. There, although the direct injection internal combustion engine is shown in FIG. 4 as an example, There is no need to say that the internal combustion engine diagnosis apparatus in accordance with the present invention can be realized using a port injection internal combustion engine.

Further, although the temperature sensor 2 is arranged at a position down stream of the catalyst, the temperature sensor 2 may be directly attached to the catalyst.

Figure 1A:
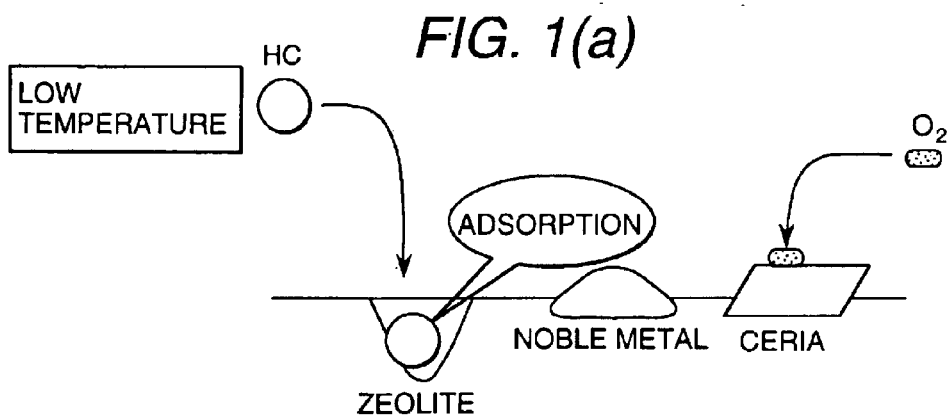
FIG. 1 is schematic views showing the cleaning-up principle of an HC adsorption catalyst under (a) a low temperature condition and (b) a high temperature condition.
Figure 1B:
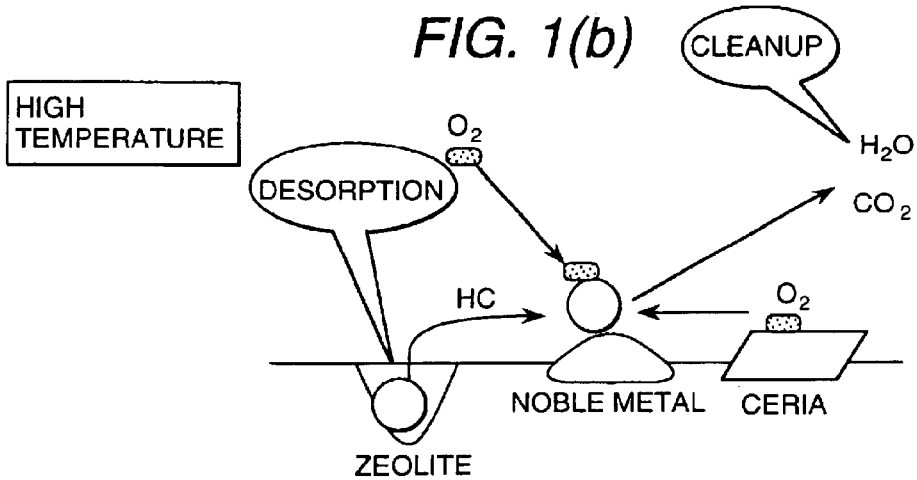
Figure 2:
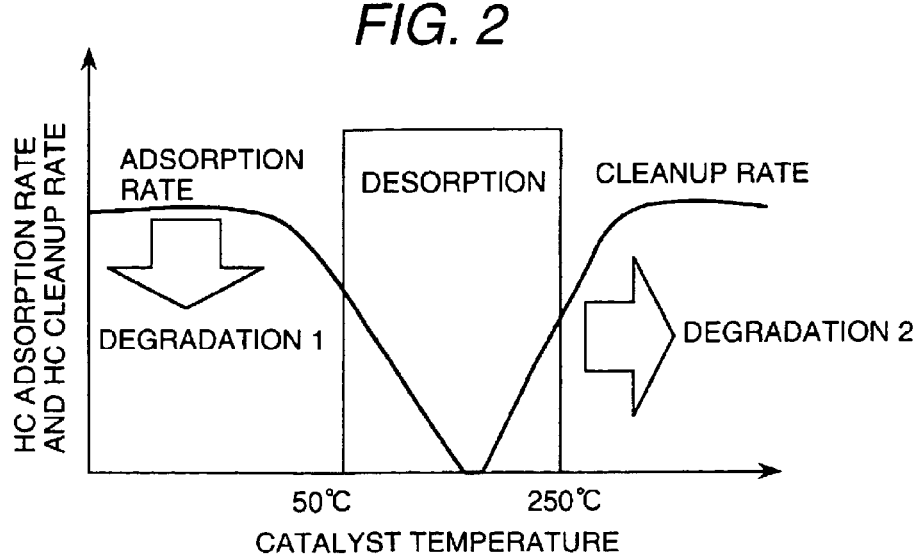
FIG. 2 is a graph showing the relationship between adsorption rate/cleanup rate and temperature of an HC adsorption catalyst.
Figure 3:
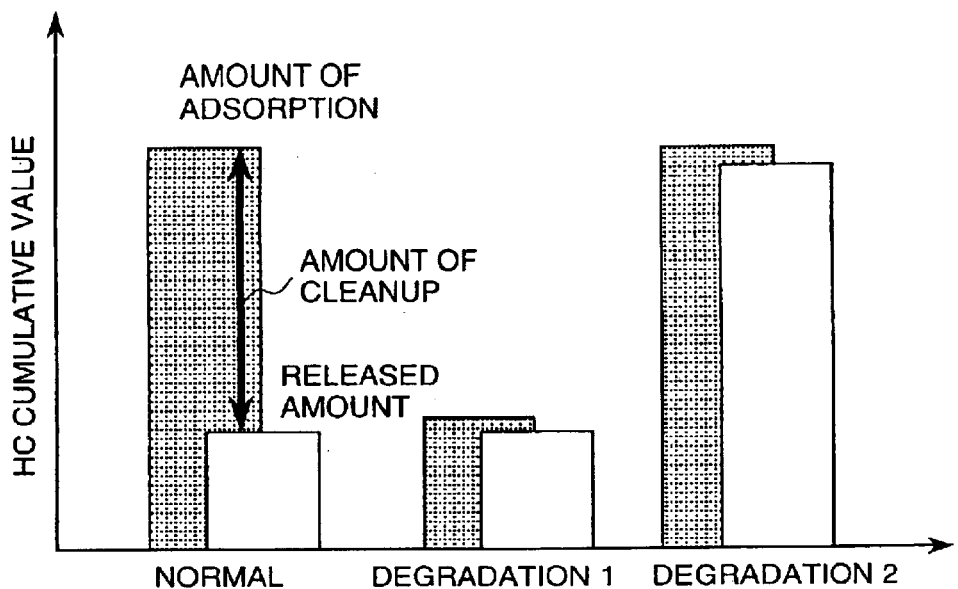
FIG. 3 is a graph showing patterns of normal and degraded HC adsorption catalyst.
Figure 5:
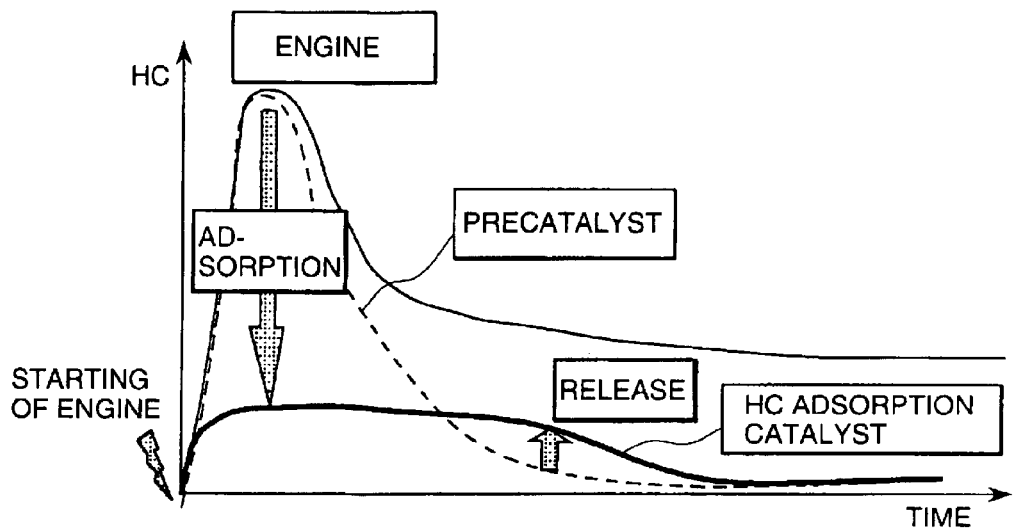
FIG. 5 is a graph showing the relationship between exhausted HC and time after starting of the engine based on the diagnosis apparatus of FIG. 4.

FIG. 5 shows an example of an exhaust profile of the internal combustion engine 1 in the embodiment of FIG. 4. The HC adsorption catalyst 10 adsorbs HC before lighting-off of the pre-catalyst 9, and reduces exhaust gas by cleaning up during desorbing HC. However, as shown in FIG. 2, HC is released without being cleaned up depending on degradation of the adsorption rate and the cleanup ratio and the operating condition, and accordingly the amount of released HC may be increased to degrade the exhaust gas as the degradation is progressed.

Figure 6:
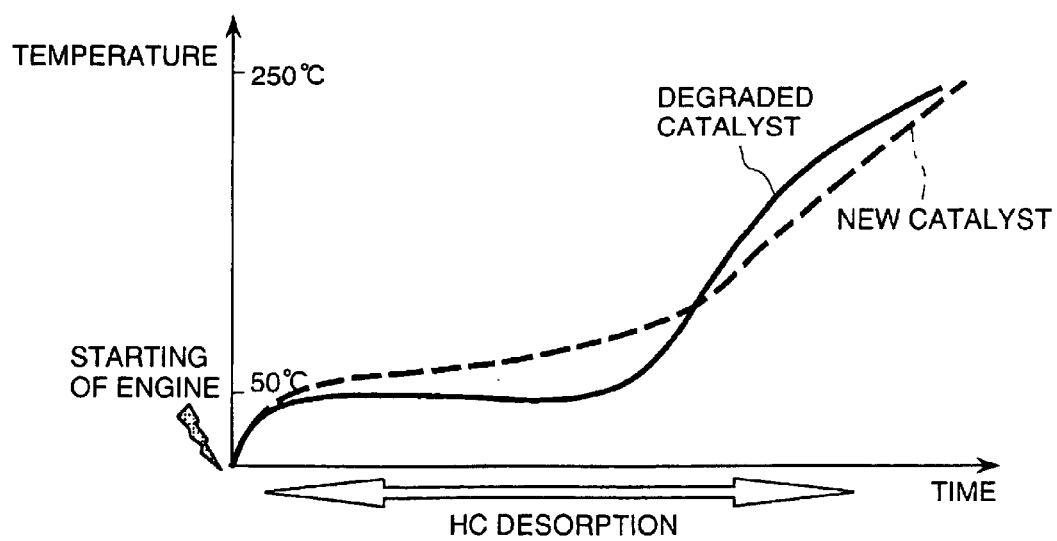
FIG. 6 a graph showing the relationship between temperature during HC desorbing of the HC adsorption catalyst and time after starting of the engine based on the internal combustion engine diagnosis apparatus of FIG. 4.

FIG. 6 shows a temperature profile after starting the internal combustion engine obtained by a temperature sensor attached to a position several cm downstream of the HC adsorption catalyst 10. As shown in FIG. 6, the temperature characteristic during desorbing HC is different between a degraded catalyst and a normal (new) catalyst. The reason is that the heat of reaction (desorbed HC and water are re-adsorbed, or desorbed HC is react with oxygen) and heat capacity (varied by adsorbed HC and water) during the HC desorbing period are varied by the adsorption performance and the cleanup performance.

Therefore, by utilizing the temperature variation during the HC desorbing period, the HC adsorption catalyst 10 can be diagnosed from the temperature during the HC desorbing period. Further, since the pre-catalyst 9 is generally activated after desorbing HC, there is no difference in heat of reaction between the degraded catalyst and the normal catalyst because HC does not flow into the HC adsorption catalyst 10 after desorbing HC. That is, in order to diagnose degradation of the HC adsorption catalyst 10 based on the temperature, it is necessary to measure the temperature during desorbing HC. In more detail, in order to diagnose based on the temperature, it is necessary to diagnose based on a temperature range from a desorption starting temperature (50° C.) to a desorption ending temperature (250° C.).

Figure 7:
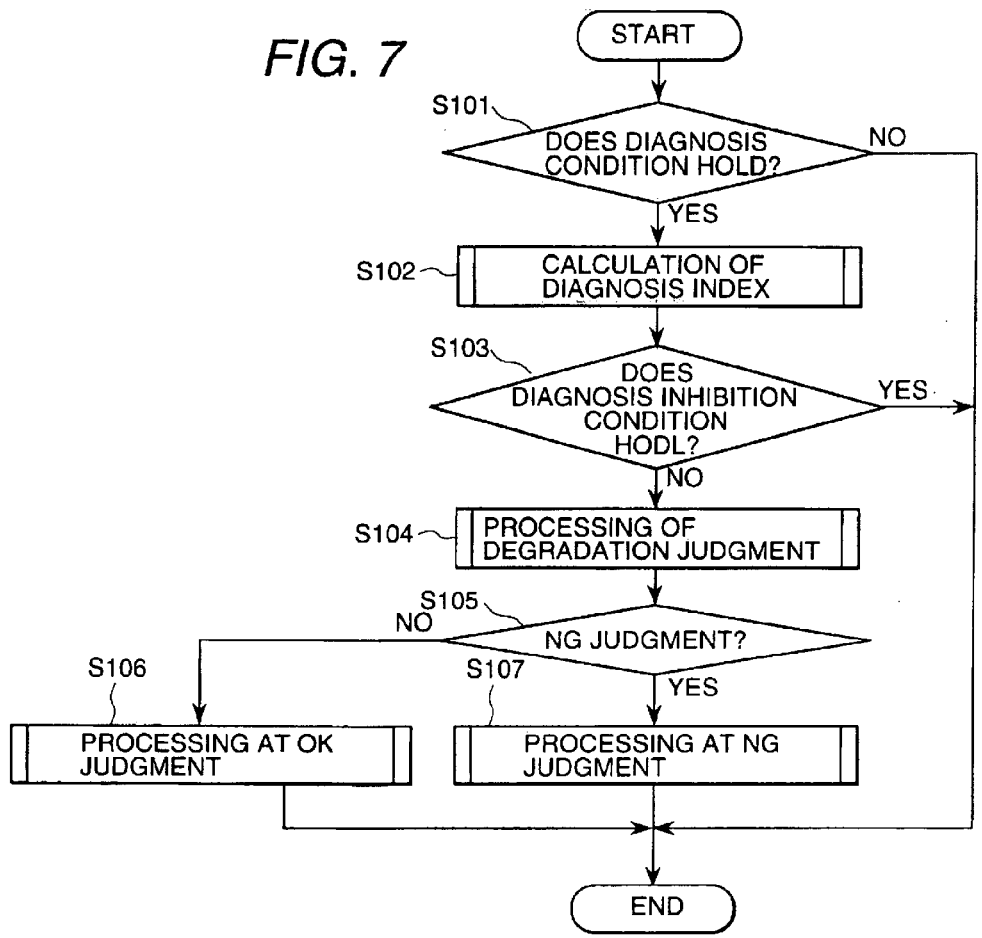
FIG. 7 is a control flowchart showing diagnosing procedure of the internal combustion engine diagnosis apparatus of FIG. 4.

FIG. 7 is a control flowchart of degradation judgment of the HC adsorption catalyst 10 used in the present embodiment of the internal combustion engine diagnosis apparatus.

In Step S101, it is checked whether or not the diagnosis condition holds. If the diagnosis condition to be described below holds, the processing of the steps after Step S102 is executed. If the diagnosis condition does not hold, the processing of the steps after Step S102 is not executed to complete the diagnosis.

The diagnosis conditions of Step S101 considered are that the HC adsorption catalyst 10 is in a state capable of adsorbing HC at starting of the engine (the catalyst temperature is below a given value, or water temperature of the internal combustion engine is below a given value, or elapsed time after stopping operation of the internal combustion engine is larger than a given time), and that there is no failure in the other devices (abnormalities in the water temperature sensor, the air-fuel ratio sensor, the thermostat, the pre-catalyst and so on).

A degradation index, to be described later, of the catalyst is calculated in Step S102, and it is judged in Step S103 whether or not a diagnosis inhibition condition holds. If the diagnosis inhibition condition, to be described below, holds, the processing of the steps after Step S104 is not executed to complete the diagnosis. If the diagnosis inhibition condition does not hold, the processing of the steps after Step S104 is executed.

The diagnosis inhibition conditions of Step S103 considered are that an operating condition during calculating the degradation index is within a given range (the cumulative value and the maximum value of an intake air flow rate are smaller than given values, fuel cut cumulative time is smaller than a given value and so on), and that the calculation of the degradation index is not completed.

Because the present embodiment of the diagnosing method is particularly sensitive to the degradation of the pre-catalyst 9 and the operating condition of the engine, it is necessary to judge whether or not these conditions satisfy the given conditions.

Next, in Step S104, degradation judgment processing, to be described later, is executed, and a degradation judgment flag is set if degradation is judged. In Step S105, if degradation is judged, according to the degradation flag in Step S104 the processing proceeds to Step S107 to execute processing at NG judgment. If not, the processing proceeds to Step S106 to execute processing at OK judgment.

In the processing at NG judgment of Step S107, a warning light (MIL) of the internal combustion engine is put on, and the abnormal judgment record is stored in a non-volatile memory. On the other hand, in the processing at OK judgment of Step S106, completion of the diagnosis and the normal judgment record are stored in the non-volatile memory.

According to the control flowchart for degradation judgment of FIG. 7, an erroneous diagnosis can be prevented by providing the diagnosis condition of Step S101 to inhibit diagnosis under condition that the temperature of the HC adsorption catalyst after stopping operation of the engine is high not to exert the adsorption performance. Further, it is possible to prevent occurrence of an erroneous diagnosis caused by a failure of another device (for example, when an abnormality occurs in the pre-catalyst, an erroneous diagnosis may be caused because HC always flows into the HC adsorption catalyst).

Further, by providing the diagnosis inhibition condition of Step S103, an erroneous diagnosis can be prevented by inhibiting the degradation judgment when any operating condition influencing HC desorption is detected.

Figure 8:
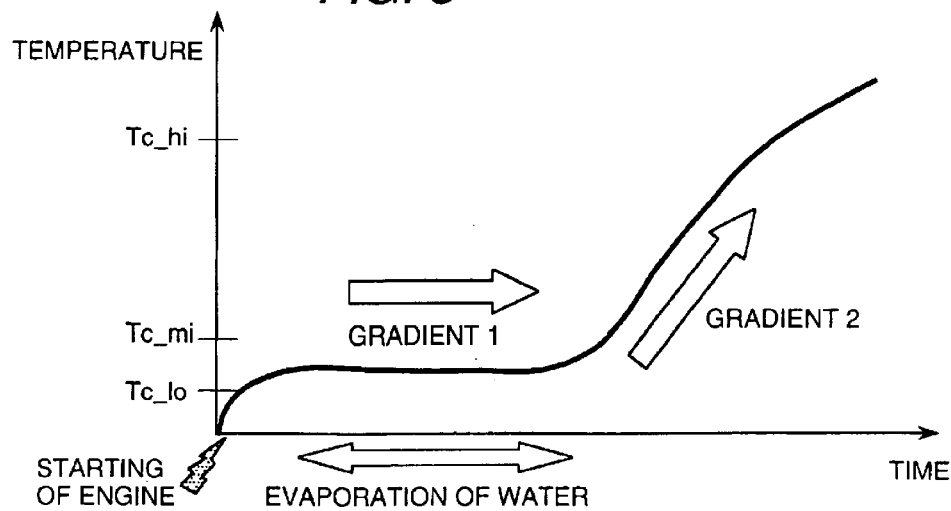
FIG. 8 is a graph showing the relationship between temperature (temperature gradient) of the HC adsorption catalyst during HC desorbing and time after starting of the engine based on the internal combustion engine diagnosis apparatus of FIG. 4.

FIG. 8 is a graph explaining the temperature gradient of the HC adsorption catalyst used for calculation of the degradation index. A gradient 1 indicates a temperature gradient during evaporating water adsorbed to the catalyst. There, the gradient 1 is affected by three heat elements. That is, one is the exhaust heat flowing into the catalyst, another is the heat of evaporation at evaporating the water, and the other is the heat of reaction (generated at adsorbing and at cleaning up) of the HC desorption. The gradient 1 is strongly correlated with the heat of reaction of the desorbing HC because an amount of exhaust heat flowing into the catalyst during evaporating water is small and the heat of evaporation is not affected by the degradation state of the catalyst. Further explaining in detail, when the catalyst is cooled by the heat of evaporation at evaporating water, the desorbed HC is re-adsorbed or HC newly flowing into the catalyst is adsorbed to the catalyst to generate heat caused by the adsorption. Therefore, the adsorption performance of the catalyst is higher as the gradient 1 is larger, and accordingly the gradient 1 can be used as a degradation index of the HC adsorption catalyst.

On the other hand, a gradient 2 is a temperature gradient after evaporating water, and the gradient 2 rises more rapidly as the cleanup amount is smaller, on the contrary to the gradient 1. This is because the gradient 2 is caused by the exhaust gas flowing into the catalyst and the heat transfer characteristic of the catalyst, and when the cleanup amount is reduced, the difference between the catalyst temperature and the flow-in exhaust gas temperature is increased to increase the amount of transferred heat after evaporating water. Therefore, since the temperature of the catalyst rises rapidly, the degradation index can be calculated from the gradient 2.

In a new catalyst, an amount of water or HC adsorbed onto the surface of the catalyst is large, and the heat capacity is also large because zeolite is not crushed yet. This is one of reasons that the temperature rising rate of a new catalyst is moderate. There, the temperatures $Tc\_lo$, $Tc\_mi$ and $Tc\_hi$ in FIG. 8 indicates temperature of starting HC desorption, temperature of ending water evaporation and temperature ending HC desorption, respectively. If an initial condition of a vehicle is equal to a condition of an FTP mode test, the temperature $Tc\_lo$ is about 50° C. at a position several cm downstream of the catalyst, the temperature $Tc\_mi$ is about 80° C., and the temperature $Tc\_hi$ is about 250° C.

Figure 9:
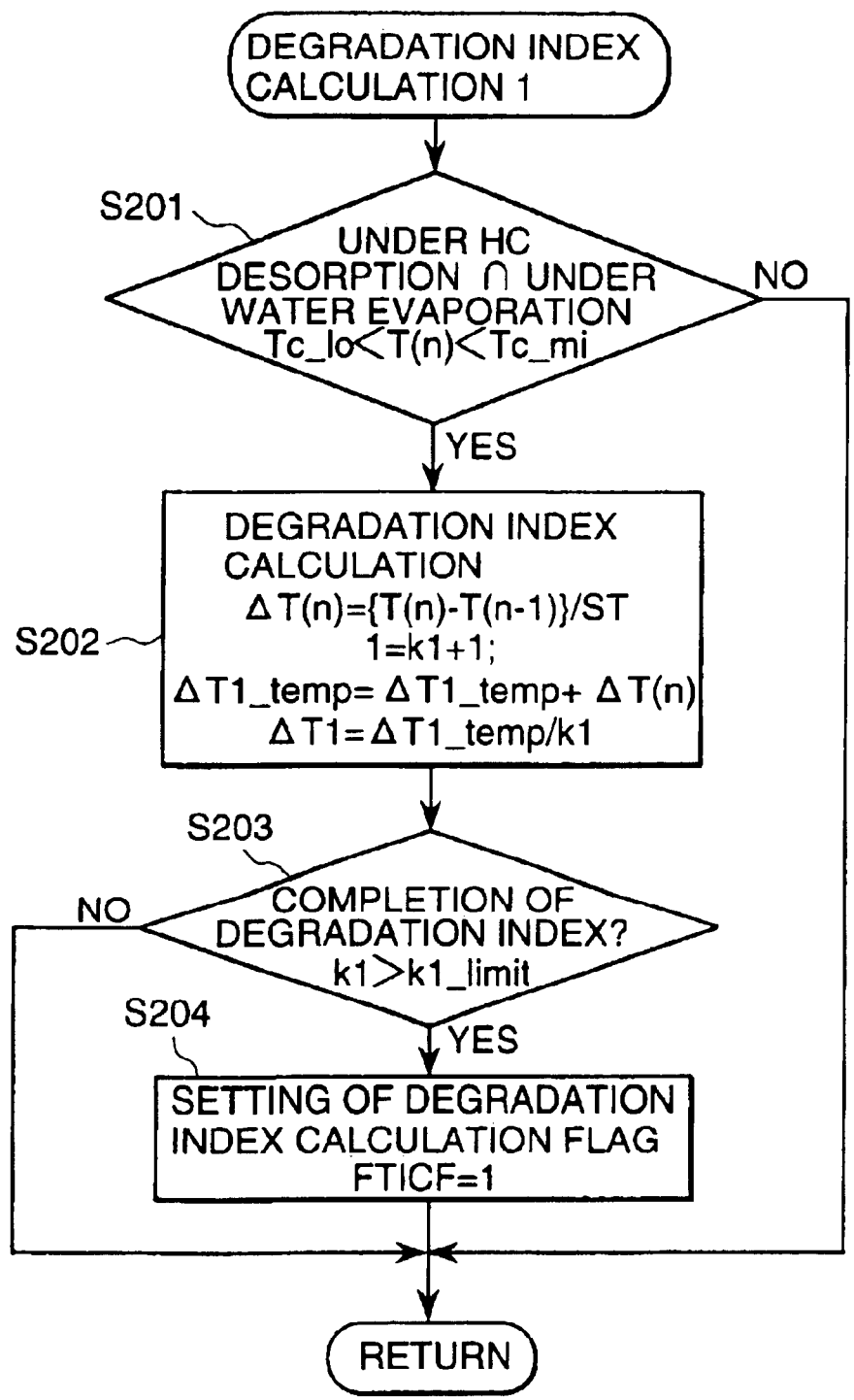
FIG. 9 is a control flowchart of calculating the degradation index using the temperature (temperature gradient) of the HC adsorption catalyst during HC desorbing based on the internal combustion engine diagnosis apparatus of FIG. 4.

A method of calculating the degradation index will be described below, taking the above characteristics into consideration. FIG. 9 is a control flowchart of calculating the degradation index based on the gradient 1. In Step S201, it is judged whether or not the condition is under HC desorption and under water evaporation. If the condition holds, the processing of the steps after Step S202 is executed. If the condition does not hold, the processing of the steps after Step S202 is not executed to complete the calculation processing.

In the concrete, Step S201 is executed by judging whether or not the catalyst temperature falls between the desorption starting temperature $Tc\_lo$ (about 50° C., to be varied a little depending on the position of the temperature sensor) determined by the catalyst performance and the water evaporation temperature $Tc\_mi$ (about 80° C., to be varied a little depending on the position of the temperature sensor).

In Step S202, a case of calculating an average value of the gradient as the degradation index is shown. In the concrete, the catalyst temperature is sampled in a cycle of ST, and a gradient $\Delta T(n)$ is calculated from a difference to the precedent value $T(n-1)$, and the obtained gradient is summed every sampling, and the summed value is divided by number of sampling times k1. The degradation index is not limited to the average value, but another statistical reference value such as a maximum frequency value or a center value may be used.

In Step S203, if number of sampling times k1 is larger than a preset value $k1\_limit$, the processing proceeds to Step S204 to set degradation calculation completion flag FTICF.

Figure 10:
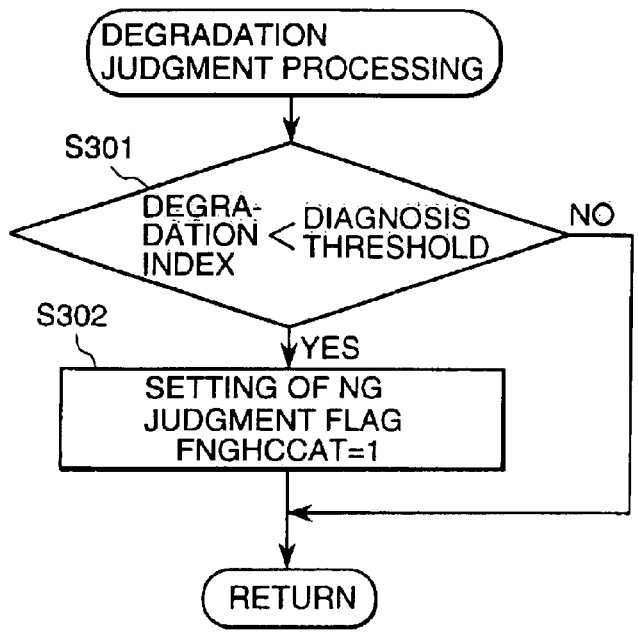
FIG. 10 is a control flowchart showing a portion of the degradation judgment processing of the control flowchart of FIG. 7.

On the other hand, in Step S104 of FIG. 7, the degradation can be judged by executing the processing shown by the control flowchart of FIG. 10. In Step S301, a degradation index 1 is compared with a diagnosis threshold which is set corresponding to an exhaust gas criteria. If the degradation index is smaller than the diagnosis threshold, it is judged that the HC adsorption catalyst 10 is degraded. In Step S302, NG judgment flag FNGHCCAT is set. Further, in order to make the diagnosis accurate, it is preferable to correct the diagnosis threshold using the cumulative value or the maximum value of the air flow rate during the HC desorbing period.

Figure 11:
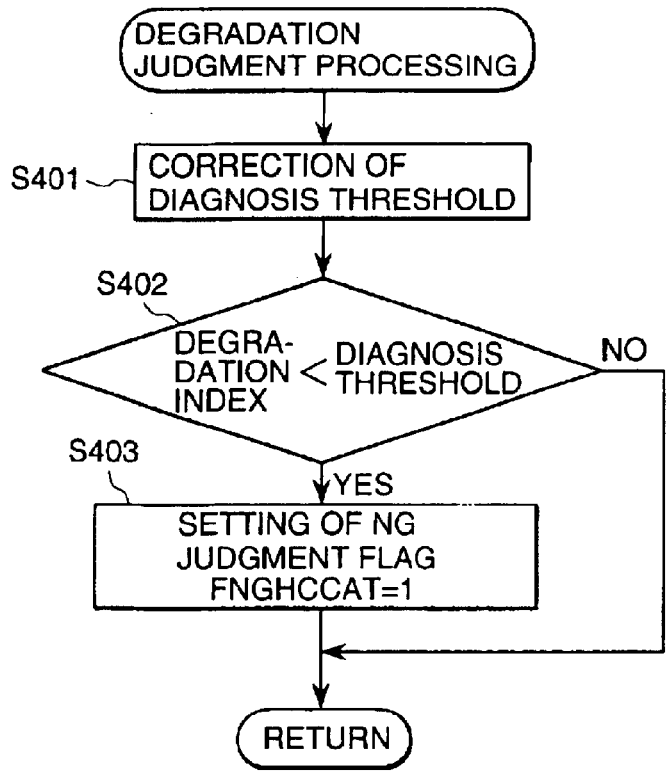
FIG. 11 is a control flowchart in which correction of diagnosis threshold is added to the degradation judgment processing of FIG. 10.
Figure 12A:
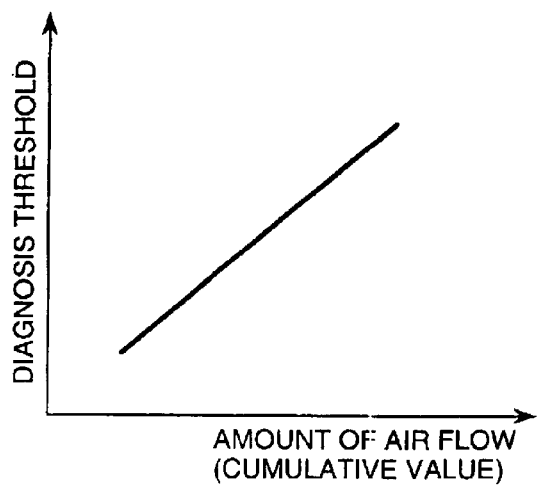
FIG. 12 is a graph showing an example of a map for correcting the diagnosis threshold depending on the operating condition.
Figure 12B:
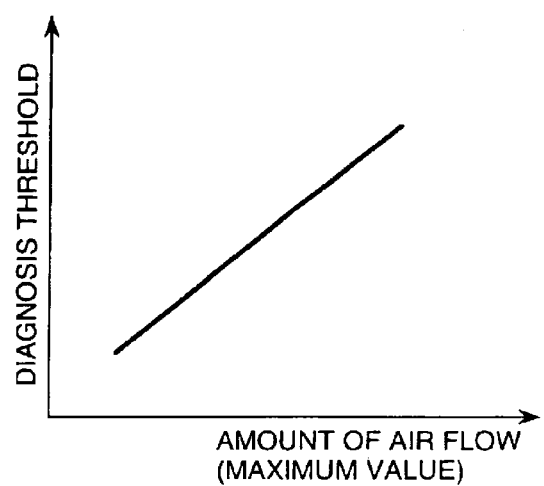

By correcting the diagnosis threshold in Step S401, for example, as shown in the control flowchart of FIG. 11 (for example, correcting based on the cumulative value of the air flow rate as shown in FIG. 12 (a), or correcting based on the maximum value of the air flow rate as shown in FIG. 12 (b)), the HC adsorption catalyst 10 can be diagnosed without being affected by the operating condition. Step S402 and Step S403 of FIG. 11 are the same as Step S301 and Step S302 of FIG. 10.

Figure 13:
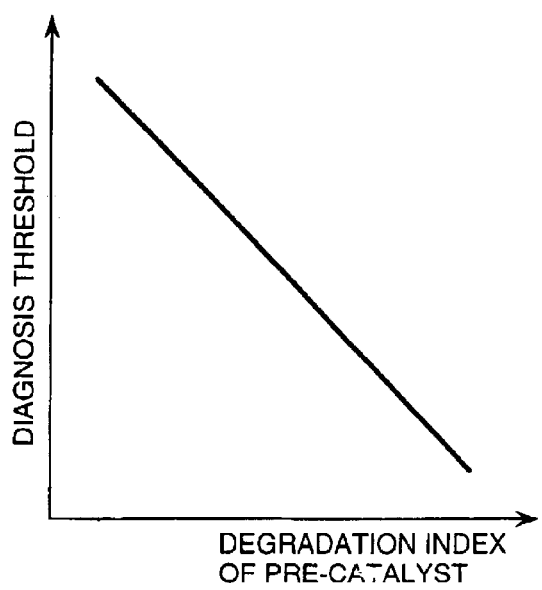
FIG. 13 is a graph showing an example of a map for correcting the diagnosis threshold depending on the degradation of the catalyst.

Further, by correcting the diagnosis threshold based on the degradation index of the pre-catalyst 9 as shown in FIG. 13, the HC adsorption catalyst 10 can be diagnosed without being affected by the degradation of the pre-catalyst 9.

Figure 14:
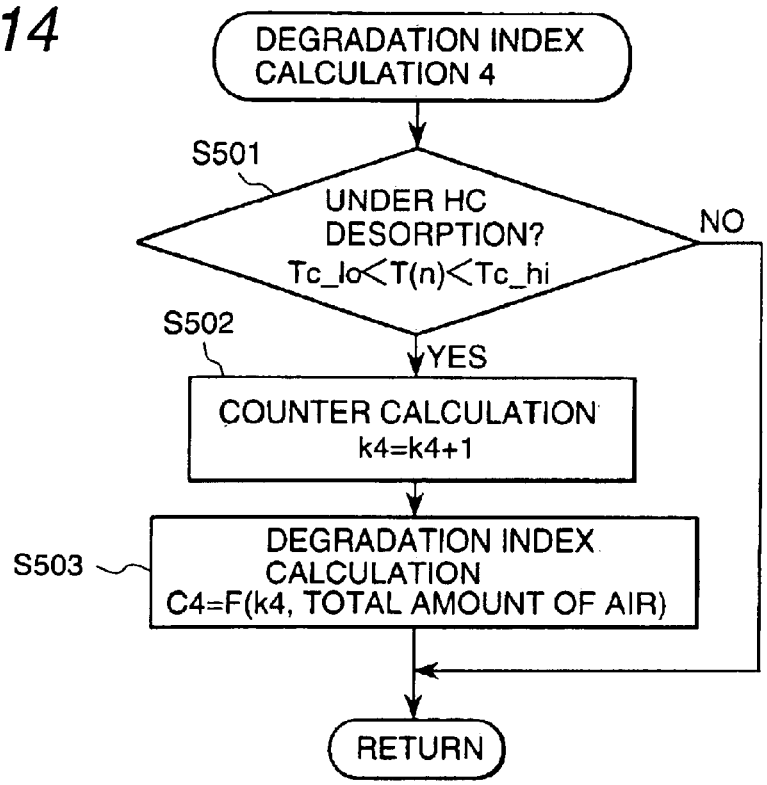
FIG. 14 is a control flowchart of calculating the degradation index of the pre-catalyst of the internal combustion engine diagnosis apparatus of FIG. 4.

FIG. 14 shows a control flowchart of calculating the degradation index of the pre-catalyst 9. In Step S501, it is judged whether or not the catalyst is under HC desorption. If the catalyst is under HC desorption, the processing of the steps after Step S502 is executed. If the catalyst is not under HC desorption, the processing of the steps after Step S502 is not executed. In Step S502, time spent in desorption (desorption time) is measured by counter calculation. In Step S503, the degradation index is calculated from a map of desorption time and a cumulative value of air flow rate (a total amount of air flow) in-taken during the desorbing period.

Figure 15:
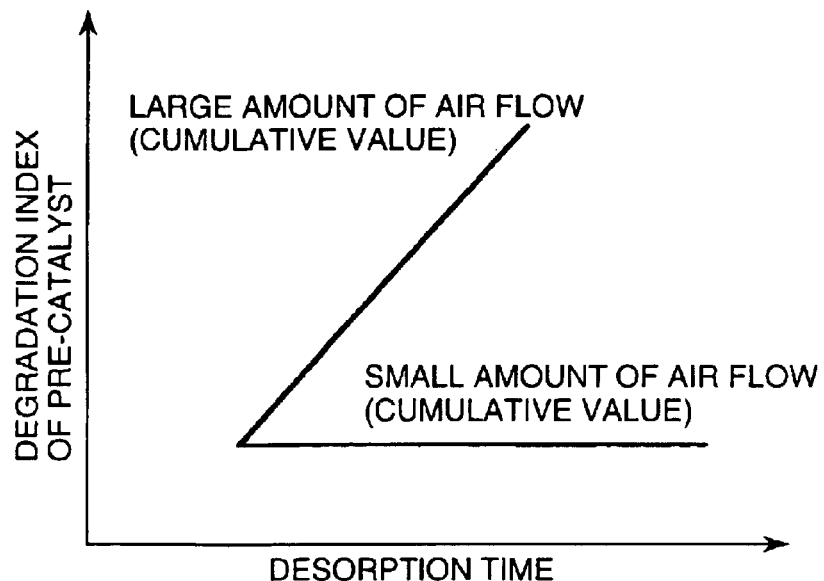
FIG. 15 is a graph showing the relationship between the degradation index of FIG. 14 and the operating condition.

FIG. 15 is a map showing the relationship between the degradation index of the pre-catalyst and the total amount of air flow. By making the degradation index of the pre-catalyst larger as the desorption time is longer, and by making the degradation index larger as the total amount of air flow is larger when the desorption time is kept constant, an effect of the operating condition can be corrected.

Although the embodiment of the present invention has been described in detail, it is to be understood that the present invention is not limited to the above embodiment, and that various changes in design may be resorted to without departing from the spirit of the present invention described in what is claimed is.

Although diagnosing method based on the gradient 1 of FIG. 8 has been described, the degradation of the HC adsorption catalyst 10 can be diagnosed, for example, by calculating the degradation index 2 from a statistical value (an average value or the like) of the gradient 2, and then comparing the degradation index 2 with a diagnosis threshold corrected by taking the operating condition and degradation of the pre-catalyst into consideration.

Further, as another degradation index, the degradation of the HC adsorption catalyst 10 can be diagnosed by calculating a degradation index 3 based on the gradient 1 and the gradient 2, and then comparing the degradation index 3 with a diagnosis threshold corrected by taking the operating condition and degradation of the pre-catalyst into consideration. Particularly, since the degradation index 3 is hardly affected by open-air temperature, the diagnosis can be accurately performed by the degradation index 3.

Furthermore, although description has been made on the method of calculating only one degradation index and then comparing the degradation index with the diagnosis threshold, the degradation can be judged by calculating a plurality of degradation indexes and then selecting one or more indexes out of the plurality of degradation indexes. For example, when an accelerator is suddenly operated during water evaporation period, the degradation may be judged using the degradation index based on the gradient 2 by inhibiting judgment using the degradation index based on the gradient 1.

It can be understood from the above description that the internal combustion engine diagnosis apparatus in accordance with the present invention can diagnose the HC adsorption catalyst from the temperature variation state of the HC adsorption catalyst in the temperature range of 50° C. to 250° C. during desorbing HC from the HC adsorption catalyst.

In other words, by utilizing the heat of reaction of the HC adsorption catalyst at desorbing HC (the heat of reaction is decreased by progress of degradation), the HC cleanup power of the HC adsorption catalyst can be accurately diagnosed, and the diagnosis of the HC adsorption catalyst can be performed without being affected by the degradation state of the cleanup catalyst arranged upstream of the HC adsorption catalyst.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine diagnosis apparatus comprising a cleanup catalyst arranged in an exhaust pipe of an internal combustion engine; and an HC adsorption catalyst arranged in parallel to and downstream of said cleanup catalyst, during high temperature period said HC adsorption catalyst desorbing and cleaning up HC desorbed during low temperature period, wherein degradation of said HC adsorption catalyst is diagnosed based on temperature of said HC adsorption catalyst while HC is being desorbed from said HC adsorption catalyst (during HC desorbing period) and wherein a temperature gradient during evaporating of water adsorbed to said HC adsorption catalyst is calculated, and said temperature gradient is compared with a preset diagnosis threshold, and if said temperature gradient is smaller than said diagnosis threshold, it is judged that said HC adsorption catalyst is degraded.

2. An internal combustion engine diagnosis apparatus comprising a cleanup catalyst arranged in an exhaust pipe of an internal combustion engine; and an HC adsorption catalyst arranged in parallel to and downstream of said cleanup catalyst, during high temperature period said HC adsorption catalyst desorbing and cleaning up HC desorbed during low temperature period, wherein degradation of said HC adsorption catalyst is diagnosed based on temperature of said HC adsorption catalyst while HC is being desorbed from said HC adsorption catalyst (during HC desorbing period) and wherein a temperature gradient after evaporating of water adsorbed to said HC adsorption catalyst is calculated, and said temperature gradient is compared with a preset diagnosis threshold, and if said temperature gradient is larger than said diagnosis threshold, it is judged that said HC adsorption catalyst is degraded.

3. An internal combustion engine diagnosis apparatus comprising a cleanup catalyst arranged in an exhaust pipe of an internal combustion engine; and an HC adsorption catalyst arranged in parallel to and downstream of said cleanup catalyst, during high temperature period said HC adsorption catalyst desorbing and cleaning up HC desorbed during low temperature period, wherein degradation of said HC adsorption catalyst is diagnosed based on temperature of said HC adsorption catalyst while HC is being desorbed from said HC adsorption catalyst (during HC desorbing period) and wherein a temperature gradient during evaporating of water adsorbed to said HC adsorption catalyst and a temperature gradient after evaporating of water adsorbed to said HC adsorption catalyst are calculated, and a ratio of said two temperature gradients is compared with a preset diagnosis threshold, and if said temperature gradient ratio is larger than said diagnosis threshold, it is judged that said HC adsorption catalyst is degraded.

4. An internal combustion engine diagnosis apparatus comprising a cleanup catalyst arranged in an exhaust pipe of an internal combustion engine; and an HC adsorption catalyst arranged in parallel to and downstream of said cleanup catalyst, during high temperature period said HC adsorption catalyst desorbing and cleaning up HC desorbed during low temperature period, wherein a time period that HC is being desorbed from said HC adsorption catalyst (HC desorbing time period) is measured, and if said HC desorbing time period is larger than a preset diagnosis threshold, it is judged that said HC adsorption catalyst is degraded and wherein if a cumulative value or a maximum value of a flow rate of air flowing into said internal combustion engine during said HC desorbing time period exceeds a preset value, judgment of degradation of said HC adsorption catalyst is prohibited.

5. An internal combustion engine diagnosis apparatus comprising a cleanup catalyst arranged in an exhaust pipe of an internal combustion engine; and an HC adsorption catalyst arranged in parallel to and downstream of said cleanup catalyst, during high temperature period said HC adsorption catalyst desorbing and cleaning up HC desorbed during low temperature period, wherein a time period that HC is being desorbed from said HC adsorption catalyst (HC desorbing time period) is measured, and if said HC desorbing time period is larger than a preset diagnosis threshold, it is judged that said HC adsorption catalyst is degraded and wherein said diagnosis threshold is corrected based on a flow rate of air flowing into said internal combustion engine during said HC desorbing time period.

6. An internal combustion engine diagnosis apparatus according to claim 1, wherein said diagnosis threshold is corrected based on a flow rate of air flowing into said internal combustion engine.

7. An internal combustion engine diagnosis apparatus according to claim 5, wherein when said HC desorbing time period exceeds said diagnosis threshold corrected based on the flow rate of air flowing into said internal combustion engine, it is judged that said cleanup catalyst arranged upstream of said HC adsorption catalyst is degraded.

8. An internal combustion engine diagnosis apparatus according to claim 4, wherein said internal combustion engine comprises an air flow rate measurement instrument for measuring or estimating a flow rate of air flowing into said internal combustion engine.

9. An internal combustion engine diagnosis apparatus comprising a cleanup catalyst arranged in an exhaust pipe of an internal combustion engine; and an HC adsorption catalyst arranged in parallel to and downstream of said cleanup catalyst, during high temperature period said HC adsorption catalyst desorbing and cleaning up HC desorbed during low temperature period, wherein degradation of said HC adsorption catalyst is diagnosed based on a gradient of temperature of said HC adsorption catalyst during a period when temperature of said HC adsorption catalyst is within a range of 50° C. to 250° C. wherein said internal combustion engine comprises a temperature detector for detecting temperature of said HC adsorption catalyst, and degradation of said HC adsorption catalyst is diagnosed based on a detected value of said temperature detector and a temperature gradient during evaporating of water adsorbed to said HC adsorption catalyst is calculated, and said temperature gradient is compared with a preset diagnosis threshold, and if said temperature gradient is smaller than said diagnosis threshold, it is judged that said HC adsorption catalyst is degraded.

10. An internal combustion engine diagnosis apparatus comprising a cleanup catalyst arranged in an exhaust nine of an internal combustion engine: and an HC adsorption catalyst arranged in parallel to and downstream of said cleanup catalyst, during high temperature period said HC adsorption catalyst desorbing and cleaning un HC desorbed during low temperature period, wherein degradation of said HC adsorption catalyst is diagnosed based on a gradient of temperature of said HC adsorption catalyst during a period when temperature of said HC adsorption catalyst is within a range of 50° C. to 250° C. said internal combustion engine further comprises a temperature detector for detecting temperature of said HC adsorption catalyst, and degradation of said HC adsorption catalyst is diagnosed based on a detected value of said temperature detector and wherein a temperature gradient after evaporating of water adsorbed to said HC adsorption catalyst is calculated, and said temperature gradient is compared with a preset diagnosis threshold, and if said temperature gradient is larger than said diagnosis threshold, it is judged that said HC adsorption catalyst is degraded.

11. An internal combustion engine diagnosis apparatus comprising a cleanup catalyst arranged in an exhaust pipe of an internal combustion engine; and an HC adsorption catalyst arranged in parallel to and downstream of said cleanup catalyst, during high temperature period said HC adsorption catalyst desorbing and cleaning un HC desorbed during low temperature period, wherein degradation of said HC adsorption catalyst is diagnosed based on a gradient of temperature of said HC adsorption catalyst during a period when temperature of said HC adsorption catalyst is within a range of 50° to 250° C. said internal combustion engine further comprises a temperature detector for detecting temperature of said HC adsorption catalyst, and degradation of said HC adsorption catalyst is diagnosed based on a detected value of said temperature detector and wherein a temperature gradient during evaporating of water adsorbed to said HC adsorption catalyst and a temperature gradient after evaporating of water adsorbed to said HC adsorption catalyst are calculated, and a ratio of said two temperature gradients is compared with a preset diagnosis threshold, and if said temperature gradient ratio is larger than said diagnosis threshold, it is judged that said HC adsorption catalyst is degraded.

12. An internal combustion engine diagnosis apparatus comprising a cleanup catalyst arranged in an exhaust pipe of an internal combustion engine; and an HC adsorption catalyst arranged in parallel to and downstream of said cleanup catalyst, during high temperature period said HC adsorption catalyst desorbing and cleaning up HC desorbed during low temperature period, wherein a time period that HC is being desorbed from said HC adsorption catalyst (HC desorbing time period) is measured, and if said HC desorbing time period is larger than a preset diagnosis threshold, it is judged that said HC adsorption catalyst is degraded and wherein said diagnosis threshold is corrected based on a flow rate of air flowing into said internal combustion engine during said HC desorbing time period.

* * * * *